United States Patent [19]
Ellenberger

[11] 3,967,169
[45] June 29, 1976

[54] SWITCHING DEVICE FOR THE PROTECTION OF DIRECT CURRENT DEVICES

[75] Inventor: Jakob Ellenberger, Altdorf near Nuremberg, Germany

[73] Assignee: Ellenberger & Poensgen GmbH, Altdorf near Nuremberg, Germany

[22] Filed: Jan. 3, 1975

[21] Appl. No.: 538,247

[30] Foreign Application Priority Data
Jan. 5, 1974 Germany............................ 2400396

[52] U.S. Cl. .......................... 317/33 SC; 317/40 R; 320/36; 320/48; 320/40
[51] Int. Cl.² ....................................... H02H 7/18
[58] Field of Search ............. 317/31, 33 SC, 33 VR, 317/40 R, 41; 320/40, 13, 35, 36, 10, 11, 17, 48; 340/248 B, 249; 323/15

[56] References Cited
UNITED STATES PATENTS

| | | | |
|---|---|---|---|
| 3,349,386 | 10/1967 | Zug...................................... | 340/249 |
| 3,421,066 | 1/1969 | Flynn et al...................... | 340/249 X |
| 3,447,060 | 5/1969 | Tedd................................ | 320/40 X |
| 3,576,488 | 4/1971 | Zug et al........................... | 320/40 X |
| 3,667,025 | 5/1972 | Campbell et al................. | 320/40 X |
| 3,686,530 | 8/1972 | Bogut................................ | 320/40 X |
| 3,708,738 | 1/1973 | Crawford et al................. | 320/40 X |
| 3,786,342 | 1/1974 | Molyneux ...................... | 340/249 X |
| 3,852,652 | 12/1974 | Jasinski............................ | 320/35 |
| 3,852,732 | 12/1974 | Yorksie et al. .................... | 340/249 |

Primary Examiner—J D Miller
Assistant Examiner—Patrick R. Salce
Attorney, Agent, or Firm—Spencer & Kaye

[57] ABSTRACT

A switching device for the protection of direct current devices such as accumulators, direct current machines and direct current devices, against for example excess current, excess temperature and low tension voltage.

The switching device comprises first and second excess current switches. The first switch comprises a break point and a thermal and/or electromagnetic tripping device and the second switch comprises a break point and an electromagnetic tripping device having a high resistance coil. The break point of the first switch is connected in parallel with the tripping device of the second switch. When an excess current occurs, the break point of the first switch opens, leaving the tripping device of the second switch in circuit and this opens the break point of the second switch.

The device further includes an electronic control circuit having at least one transducer for monitoring changes in at least one parameter of the direct current device to be protected. This circuit controls the gating-on of a thyristor which, when gated-on, trips the first and second switches.

The control circuit may include a resistance thermometer for monitoring a temperature in the device which is compared with a nominal temperature and/or means for monitoring the voltage across the device and comparing it with a nominal voltage.

12 Claims, 5 Drawing Figures

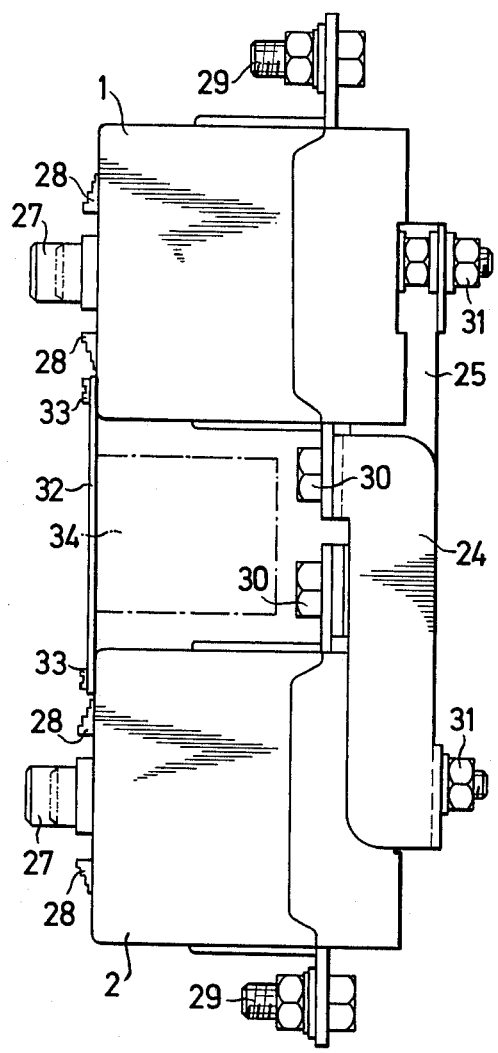
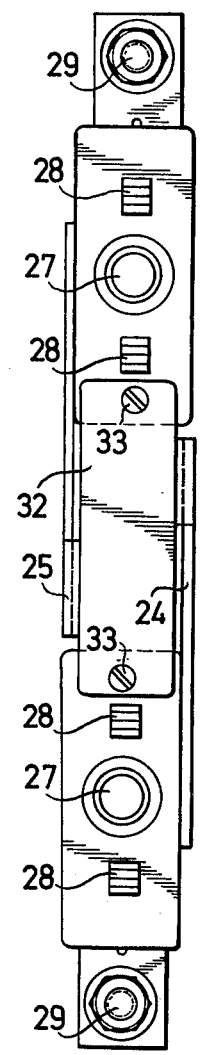
Fig. 3
Fig. 4

SWITCHING DEVICE FOR THE PROTECTION OF DIRECT CURRENT DEVICES

BACKGROUND OF THE INVENTION

The present invention relates to a switching device for the protection of direct current devices such as batteries, accumulators, direct current electrical machines and direct current electrical appliances against for example one or more of excess current, excess temperature and low-tension voltage.

For the protection of vehicular batteries quickbreak fuses have already been employed but experience has shown that the batteries are destroyed without the fuses responding.

The present invention is based on the problem of devising a switching device of the above described kind whereby the current circuit is interrupted upon the occurrence of excess current, excessive heat or unduly low voltage; harmful and powerful arcing resulting from high direct voltages of e.g. 110, 144, 220, 360, 500 V being prevented.

SUMMARY OF THE INVENTION

According to the present invention there is provided a switching device for the protection of direct current devices comprising a first excess current switch having a first break point and at least one tripping device effective to trip the first break point on the occurrence of an excess current, and a second excess current switch having a second break point and an electromagnetic tripping device to trip the second break point on the occurrence of an excess current, the electromagnetic tripping device including a coil of high ohmic design, the electromagnetic tripping device being coupled in parallel with the first break point, an electronic control circuit having means for monitoring changes in at least one physical parameter of the direct current device to be protected and for producing an output signal when the physical parameter differs by at least a predetermined amount from a reference value, and a thyristor connected to be gated-on in response to the output signal being produced and thereby tripping the first and second excess current switches.

In an embodiment of the switching device in accordance with the present invention when an excess current occurs, the first excess current switch first releases or trips thermally and/or electromagnetically so that the break point of the first excess current switch is opened. The excess current is very much reduced by the high-ohmic magnet coil of the second excess current switch. There is no interruption of the excess current since the high-ohmic field coil of the second excess current switch is connected in parallel to the opened break point of the first excess current switch. The current flowing through this magnet coil now causes tripping of the second excess current switch so that its break point is opened and thus the current circuit of the switching device is interrupted. As a result of the two stage switching the contact pieces of the break points of the two excess current switches are conserved so that the switching device has a long useful life. The switching device in accordance with the invention may be constructed to enable high currents to be switched off at high direct voltages, e.g. 110, 144, 220, 360, 500 V. Apart from the high switching-off efficiency at high direct voltages the switching device in accordance with the invention has the additional advantage that the voltage peaks which form when inductive loads are switched off, are suppressed.

When monitoring the temperature of a secondary cell, for example, to protect a battery against overcharging, the electrolyte temperature of the battery must not exceed 55°C.

The monitoring of low-tension voltage may be carried out, for example, to protect an accumulator against being excessively discharged. For the protection of the accumulator the point of disconnection, that is the actual discharge : 100% discharge, is at the so-called final discharge voltage which is indicated by the manufacturer of the accumulator.

If desired, each excess current switch may be provided with an auxiliary coil for the purpose of tripping at excess temperature and at low-tension voltage. The tripping may be done by giving the auxiliary coils a great number of turns and energising them by means of a comparatively weak current which is generated by the electronic circuit required therefor.

Preferably the first and second excess current switches are selected to switch off outputs in a ratio of about 3:1 at their break points. This means that the first excess current switch disconnects approximately three times the output of the second excess current switch.

The electromagnetic tripping means of the second excess current switch may be preceded by a resistor so that upon disconnection the excess current flowing through the break point is yet further reduced by this resistor.

Conveniently the two excess current switches are of rectangular shape, when viewed in plan, having longer sides than ends. The switches may be mounted in an end to end arrangement with a space therebetween, and they may be electrically and mechanically connected by means of two connection rails. The electronic circuit which is of modular design may then be disposed between the two excess current switches and secured to them. In this manner the two excess current switches form together with the electronic circuit a structural unit which can be accomodated in a space-saving manner and can be readily mounted.

One of the connection rails may be formed as the pre-resistor thereby, avoiding the need to provide a separate pre-resistor. The connection rail serving as pre-resistor may be of meanderline-shaped design.

The switching device in accordance with the present invention may be provided with a remote release device for remotely tripping the two excess current switches. This provides the possibility of disconnecting the switching device in case of need.

When the switching device in accordance with the invention is used to protect batteries against being excessively discharged, means for indicating a predetermined state of discharge, e.g. 80%, of the batteries may be provided. The person monitoring the battery is then warned prior to excessive discharge of the battery.

In an alternative structural arrangement the two excess current switches and the electronic circuit may be disposed in a housing to form a self contained sub-unit which can be accomodated in a space-saving manner, readily attached mechanically and simply connected electrically.

BRIEF DESCRIPTION OF THE DRAWING

The present invention will now be described by way of examples with reference to the accompanying drawings, in which:

FIG. 3 shows a structural arrangement of the switching device in which two excess current switches are arranged end to end and connected by means of two connection rails, the electronic circuit module being disposed between the switches connected to them, FIG. 4 is a plan view of FIG. 3 from the left hand side thereof.

DESCRIPTION OF THE PREFERRED EMBODIMENTS

Figure 1:
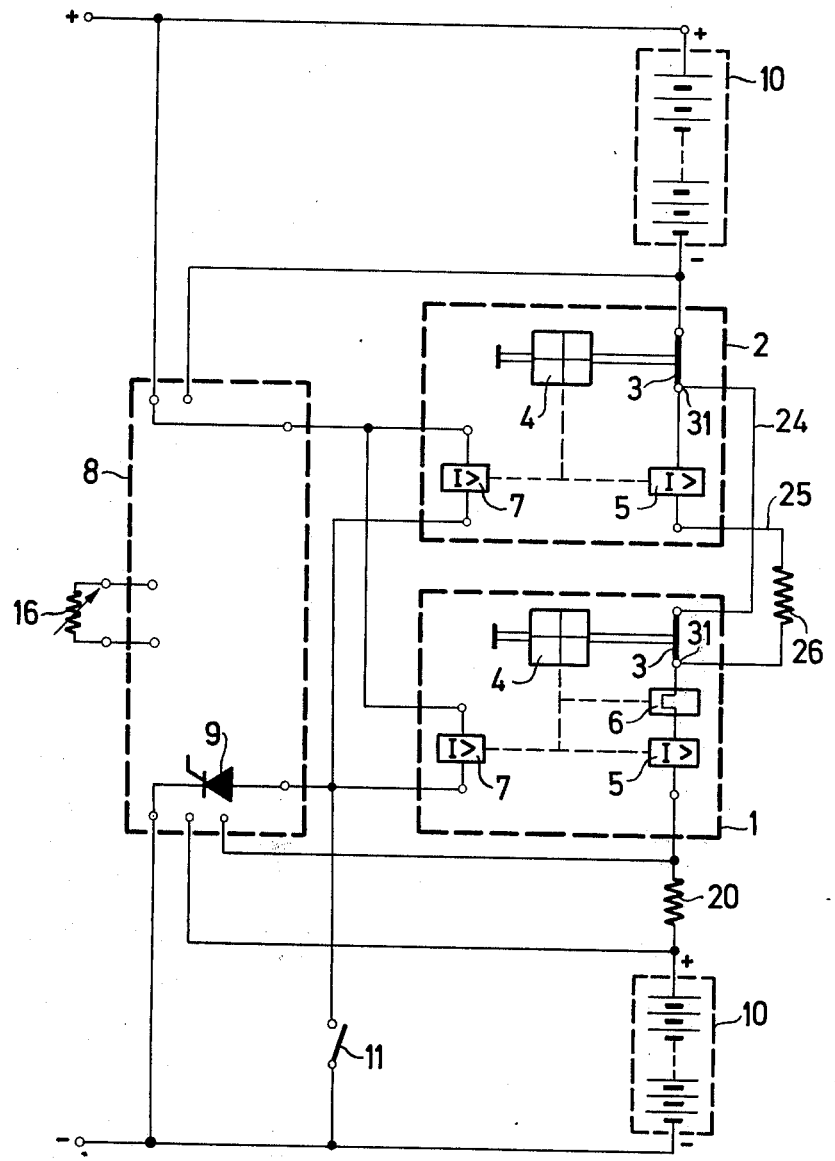
FIG. 1 is a schematic circuit diagram of a switching device made in accordance with the invention.

In FIG. 1 two excess current switches 1,2 are schematically shown. Both excess current switches have a break point 3, a latching cam 4 and an electromagnetic tripping device 5. The excess current switch 1 is additionally provided with a thermal tripping device 6. Furthermore, both excess current switches 1,2 are each provided with a respective auxiliary coil 7 for electromagnetic tripping purposes. The auxiliary coils 7 are connected in parallel and are connected to an electronic circuit 8 having a thyristor 9. The two excess current switches 1,2 are disposed between two halves 10 of an accumulator which may have for example, an overall voltage of 144 V. The circuit of FIG. 1 is additionally provided with a remote release 11 whereby the two excess current switches 1,2 can be tripped from a distance.

The excess current switches 1,2 are interconnected so that they trip sequentially. This is done by connecting a terminal 31 of break point 3 of the switch 1 connected through a resistor 26 and a conductor 25 to the electromagnetic tripping device 5 of the switch 2. The other side of the break point 3 of the switch 1 is connected by a conductor 24 to a terminal 31 of the break point 3 of the switch 2.

In operation, when an excess current occurs the excess current switch 1 first trips either thermally or electromagnetically so that the break point 3 is opened via the latching cam 4. The electromagnetic tripping device 5 of the excess current switch 2 is thereby placed in series with the electromagnetic tripping device 5 of the excess current switch 1 and the thermal tripping device thereof. The magnet coil of the electromagnetic tripping device 5 of the excess current switch 2 is of high-ohmic design and thereby reduces the excess current. Despite this reduced excess current the electromagnetic tripping device 5 of the excess current switch 2 responds and the break point 3 of the excess current switch 2 is opened via the latching cam 4. The entire current circuit of the switching device of FIG. 1 is thus interrupted. The opening travel of the movable switching member of the break point 3 of the excess current switch 2 is of sufficient magnitude as to extinguish an arc which may be formed. Although the current of the excess current switching device is not interrupted when the break point 3 of the excess current switch 1 is opened, an electric arc, which however is not harmful, appears at the opened break point 3 of the excess current switch 1 as a result of the large voltage drop at the high-ohmic magnet coil of the electromagnetic tripping device 5 of the excess current switch 2. By virtue of the two break points 3 of the two excess current switches 1 and 2 the total potential is divided into two partial potentials. The electromagnetic tripping device 5 of the excess current switch 2 responds immediately after opening of the break point 3 of the excess current switch 1.

Figure 2:
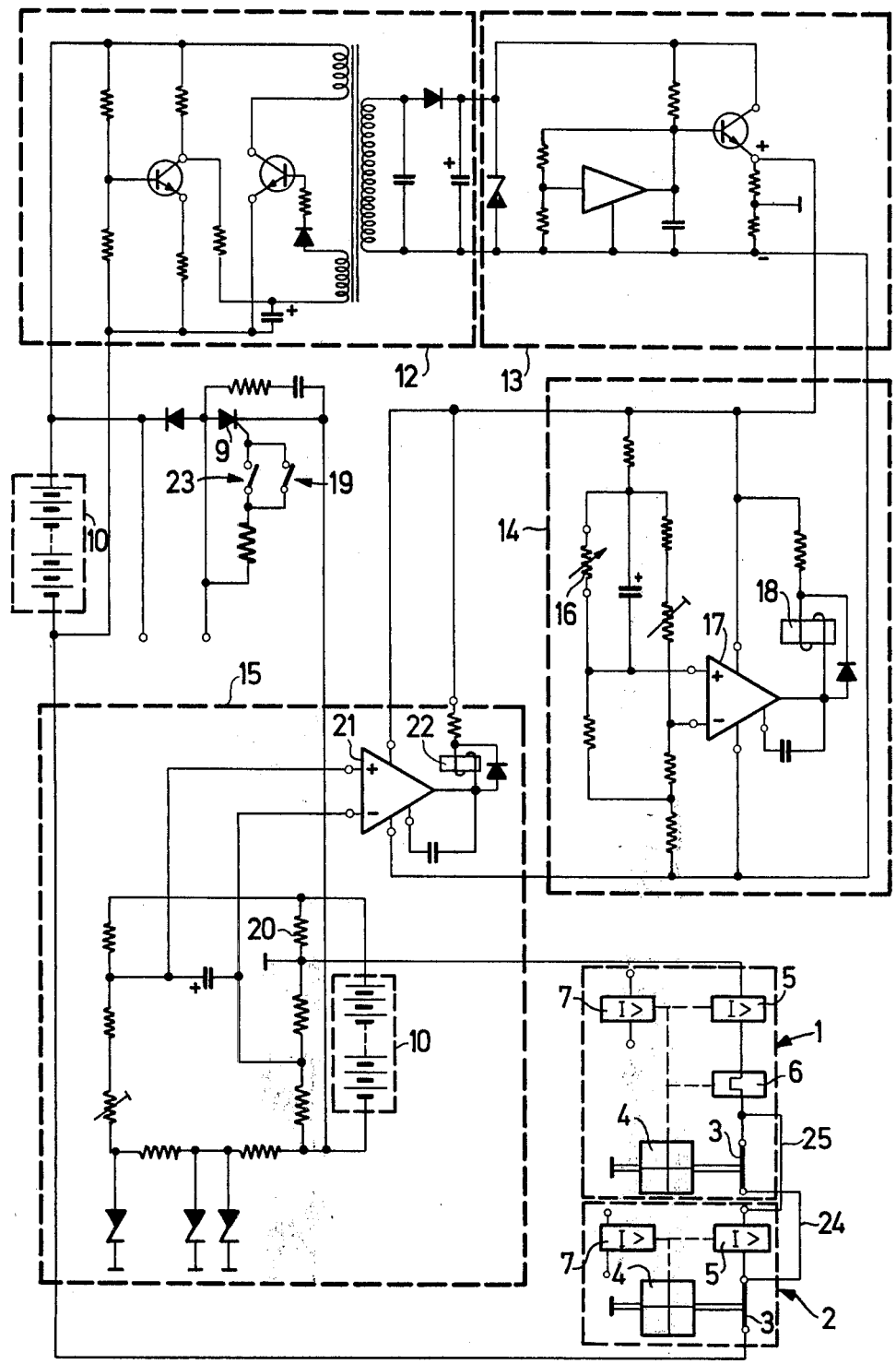
FIG. 2 shows the circuit of FIG. 1 with detailed electronic circuit.

FIG. 2 shows, apart from the two excess current switches 1 and 2, the entire electronic circuit which is in connection with the two excess current switches 1,2.

The electronic circuit has firstly a D.C. to D.C. (direct current-to-direct current) converter 12 and a direct voltage stabiliser 13 which furnishes a D.C. potential of 18 V at its output. Furthermore, the electronic circuit is provided with a circuit portion 14 for monitoring the temperature of the accumulator consisting of two halves 10, and with a circuit portion 15 for monitoring the discharging of the battery.

For measuring the temperature of the electrolyte of the accumulator there serves a built-in resistance thermometer 16 arranged in a bridge circuit. The circuit portion 14 has a processing amplifier 17 possessing an inverting input and a non-inverting input. An electromagnetic relay 18 is situated at the output of the processing amplifier 17. When a predetermined nominal temperature value is exceeded as the temperature rises, then a signal is formed at the output of the processing amplifier 17 whereby the electromagnetic relay 18 is actuated. The processing amplifier 17 is connected as a Schmitt trigger. The nominal value is applied to the inverting input of the processing amplifier 17 while the potential corresponding to the temperature of the electrolyte is applied to the noninverting input of the processing amplifier 17. When the electromagnetic relay 18 is excited contact pieces 19 are closed so that the thyristor 9 is fired. By virtue of this firing, a positive potential is applied to the parallel connected auxiliary coils 7 of the two excess current switches 1,2 so that these two excess current switches 1,2 are tripped and the entire current circuit is broken. The accumulator is thus protected against excess temperature.

For the purpose of monitoring the discharging of the accumulator the circuit portion 15 has a shunt 20 from which a voltage proportional to the discharge current is tapped. At the same time a proportional part of the battery voltage is also tapped. The sum of both tapped voltages forms the actual voltage. The circuit portion 15 also possesses a processing amplifier 21. The actual voltage is supplied to the inverting input of the processing amplifier 21 and the nominal voltage to the noninverting input thereof. The processing amplifier 21 is also connected as a Schmitt trigger. An electromagnetic relay 22 is energised by the signal appearing at the output of the processing amplifier 21 and actuates contact pieces 23 whereby the thyristor 9 is caused to fire, so that the two excess current switches 1,2 are tripped by means of the auxiliary coils 7. An impermissible, excessive discharging of the accumulator is prevented by this interruption of the current circuit.

Figure 5:
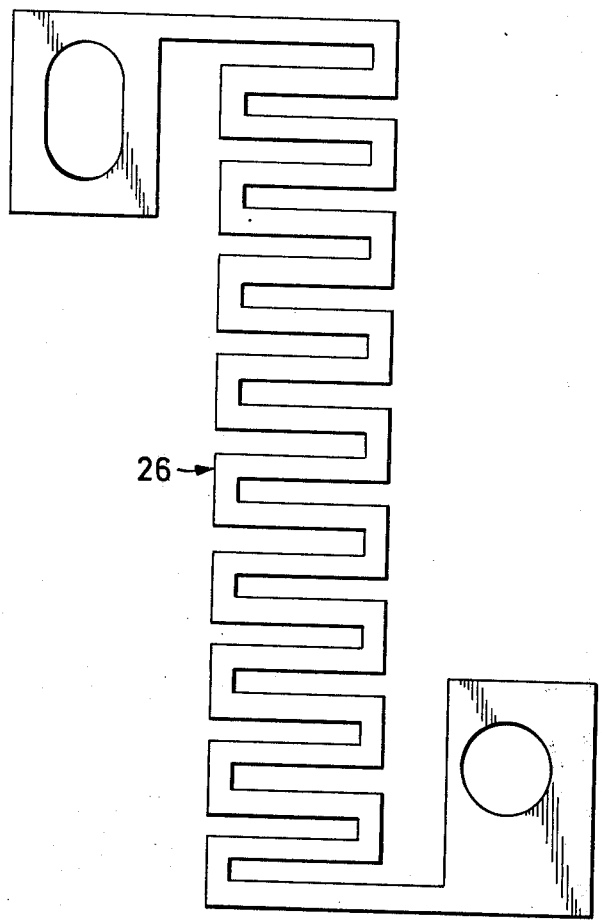
FIG. 5 is a resistor of meanderline-shaped design.

FIGS. 3 and 4 show the two excess current switches 1,2 which are electrically and mechanically connected by means of two connection rails 24 and 25. The switches 1,2 are of rectangular shape, as viewed in plan and are connected with their adjacent ends spaced from each other. The connection rail 25 may be formed as the resistor 26 which, according to FIG. 1, is connected in series with the magnet coil of the electromagnetic tripping device 5 of the excess current switch 2 and, according to FIG. 5, is of meanderline-shaped design. Both excess current switches 1,2 may be of the same mechanical design, the thermal tripping device 6 having been removed from the excess current switch 2.

Both excess current switches 1,2 have an ON push button 27, an OFF slide 28 and terminals 29 to 31. Each of the terminals 31 is electrically connected with the break point 3.

A rail 32 is secured by means of screws 33 to the upper surfaces of the two excess current switches 1,2 so as to bridge the space therebetween. A block 34 containing the electronic circuit is disposed on the underside of the rail 32.

In an alternaive, non-illustrated structural arrangement both excess current switches 1 and 2 together with the electronic circuit 8 are accomodated in a single housing to form a compact self contained sub-unit which may be easily mounted and simple to connect electrically.

I claim:
1. A switching device for the protection of direct current devices comprising, in combination:
   a. a first excess current switch having
      i. a first break point,
      ii. at least one tripping device effective to trip said first break point on the occurrence of an excess current, and
      iii. a first auxiliary coil arranged to trip said first point upon receipt of an actuation current,
   b. a second excess current switch having
      i. a second break point,
      ii. an electromagnetic tripping device effective to trip said second break point on the occurrence of an excess current, said electromagnetic tripping device having a coil of high ohmic design, said electromagnetic tripping device being coupled in parallel with said first break point, and
      iii. a second auxiliary coil arranged to trip said second break point upon receipt of an actuation current,
   c. an electronic control circuit having means for monitoring changes in at least one physical parameter of the direct current device to be protected, means for producing a reference signal and means for producing an output signal when the physical parameter differs by at least a predetermined amount from said reference signal, and
   d. a thyristor coupled to the control circuit, the thyristor being gated-on by said output signal and thereby supplying an actuation current to said first and second auxiliary coils for tripping said first and second current switches.

2. A switching device as claimed in claim 1, wherein said at least one tripping device comprises a thermal tripping device.

3. A switching device as claimed in claim 2, further comprising an electromagnetic tripping device coupled in series with said thermal tripping device.

4. A switching device as claimed in claim 1, wherein said at least one tripping device comprises another electromagnetic tripping device.

5. A switching device for the protection of a direct current circuit against excess current, excess temperature and undervoltage comprising, in combination:
   a. a first excess current switch having
      i. a first break point, and
      ii. at least one tripping device effective to trip said first break point on the occurrence of an excess current,
   b. a second excess current switch having
      i. a second break point connected in series with said first break point, and
      ii. an electromagnetic tripping device effective to trip said second break point immediately after said first break point has been tripped, said electromagnetic tripping device having a coil of high ohmic design, said coil being connected in parallel with said first break point for reducing the excess current after said first break point has been tripped,
   c. i. an electrical resistance thermometer for measuring such excess temperature,
      ii. a bridge circuit having said thermometer connected in one leg thereof,
      iii. a thyristor connected to said bridge circuit to become conductive when such excess temperature is reached,
      iv. actuating means connected between said break points and said thyristor for tripping said break points when said thyristor becomes conductive,
   d. i. a shunt connected in series in the direct current circuit and having means to tap the voltage across said shunt,
      ii. means for deriving a proportional part of a working voltage across the direct current circuit,
      iii. summing means connected for summing the proportional part of the working voltage and the voltage across said shunt to form an actual voltage signal,
      iv. means for deriving a nominal voltage signal, and
      v. an operational difference amplifier having an inverting input connected to receive said actual voltage signal, a non-inverting input connected to receive said nominal voltage signal, and an output coupled to said thyristor, said amplifier apply to said output a voltage which renders said thyristor conductive when said actual voltage signal falls below said nominal voltage signal.

6. A switching device as claimed in claim 5, wherein said first and second excess current switches are arranged to switch outputs in the ratio 3:1 at their respective break points.

7. A switching device as claimed in claim 5, further comprising a remote release for remotely tripping said first and second excess current switches.

8. A switching device for the protection of direct current devices comprising, in combination:
   a. a first excess current switch having
      i. a first break point, and
      ii. at least one tripping device effective to trip said first break point on the occurrence of an excess current,
   b. a second excess current switch having
      i. a second break point, and
      ii. an electromagnetic tripping device effective to trip said second break point on the occurrence of an excess current, said electromagnetic tripping device having a coil of high ohmic design, said electromagnetic tripping device being coupled in parallel with said first break point.
   c. an electronic control circuit having means for monitoring changes in at least one physical parameter of the direct current device to be protected, means for producing a reference signal and means for producing an output signal when the physical parameter differs by at least a predetermined amount from said reference signal, and
   d. a thyristor coupled to the control circuit, the thyristor being gated-on by said output signal and thereby tripping said first and second excess current switches, e. wherein said first and second excess current switches are of rectangular shape when viewed in plan, having longer sides than ends, and said switches being arranged end-to-end with a space therebetween, and said device further comprises two connection rails for electrically and mechanically connecting said switches together, and a module containing said electronic control circuit disposed in said space.

9. A switching device as claimed in claim 8, further comprising a resistor connected in series with said electromagnetic tripping device of said second excess current switch.

10. A switching device as claimed in claim 9, wherein one of said connection rails comprises said resistor.

11. A switching device as claimed in claim 10, wherein said one connection rail is of meanderline-shape.

12. A switching device for the protection of a direct current circuit against excess current, excess temperature and undervoltage comprising, in combination:
 a. a first excess current switch having
  i. a first break point, and
  ii. at least one tripping device effective to trip said first break point on the occurrence of an excess current,
 b. a second excess current switch having
  i. a second break point connected in series with said first break point, and
  ii. an electromagnetic tripping device effective to trip said second break point immediately after said first break point has been tripped, and a resistor connected in series with said electromagnetic tripping device of said second excess current switch, the series arrangement of said resistor and electromagnetic tripping device being connected in parallel with said first break point for reducing the excess current after said first break point has been tripped,
 c. i. an electrical resistance thermometer for measuring such excess temperature,
  ii. a bridge circuit having said thermometer connected in one leg thereof,
  iii. a thyristor connected to said bridge circuit to become conductive when such excess temperature is reached,
  iv. actuating means connected between said break points and said thyristor for tripping said break point when said thyristor becomes conductive,
 d. i. a shunt connected in series in the direct current circuit and having means to tap the voltage across said shunt,
  ii. means for deriving a proportional part of a working voltage across the direct current circuit,
  iii. summing means connected for summing the proportional part of the working voltage and the voltage across said shunt to form an actual voltage signal,
  iv. means for deriving a nominal voltage signal, and
  v. an operational difference amplifier having an inverting input connected to receive said actual voltage signal, a non-inverting input connected to receive said nominal voltage signal, and an output coupled to said thyristor, said amplifier apply to said output a voltage which renders said thyristor conductive when said actual voltage signal falls below said nominal voltage signal.

* * * * *